United States Patent
Bakshi et al.

(10) Patent No.: US 10,831,640 B2
(45) Date of Patent: Nov. 10, 2020

(54) METHOD AND SYSTEM FOR TESTING AN APPLICATION USING MULTIPLE TEST CASE EXECUTION CHANNELS

(71) Applicant: Webomates LLC, Wilmington, DE (US)

(72) Inventors: Aseem Bakshi, Darien, CT (US); Ruchika Gupta, Norwalk, CT (US); Mark Sawers, Fairfield, CT (US)

(73) Assignee: Webomates LLC, Wilmington, DE (US)

( * ) Notice: Subject to any disclaimer, the term of this patent is extended or adjusted under 35 U.S.C. 154(b) by 70 days.

(21) Appl. No.: 16/190,194

(22) Filed: Nov. 14, 2018

(65) Prior Publication Data

US 2020/0151089 A1     May 14, 2020

(51) Int. Cl.
*G06F 9/44*     (2018.01)
*G06F 11/36*     (2006.01)

(52) U.S. Cl.
CPC ...... *G06F 11/3664* (2013.01); *G06F 11/3688* (2013.01); *G06F 11/3696* (2013.01)

(58) Field of Classification Search
CPC ............. G06F 11/3664; G06F 11/3688; G06F 11/3696
See application file for complete search history.

(56) References Cited

U.S. PATENT DOCUMENTS

| | | | |
|---|---|---|---|
| 7,475,289 B2 | 1/2009 | Rosaria et al. | |
| 7,490,319 B2 | 2/2009 | Blackwell et al. | |
| 8,479,164 B2 | 7/2013 | Becker et al. | |
| 8,954,931 B2 | 2/2015 | Wefers et al. | |
| 9,201,775 B1* | 12/2015 | Cohen | G06F 11/3684 |
| 2005/0166094 A1* | 7/2005 | Blackwell | G06F 11/3664 714/38.14 |
| 2008/0092120 A1* | 4/2008 | Udupa | G06F 11/3696 717/124 |
| 2008/0244524 A1 | 10/2008 | Kelso et al. | |
| 2009/0204924 A1* | 8/2009 | West, Jr. | G06F 11/261 715/772 |
| 2010/0180260 A1 | 7/2010 | Chikkadevaiah et al. | |

(Continued)

OTHER PUBLICATIONS

Title: Eclat: Automatic generation and classification of test inputs, author: C Pacheco, published on 2005.*

(Continued)

*Primary Examiner* — Chameli Das
(74) *Attorney, Agent, or Firm* — Shumaker, Loop & Kendrick, LLP

(57) ABSTRACT

Disclosed is a system and method for testing an application using multiple software test case execution channels is disclosed. The system may be configured to receive one or more test cases for testing of the application. The system may further be configured identify a primary test case execution channel and a secondary test case execution channel, corresponding to each of the one or more test cases, from a set of test case execution channel based on one or more classification parameters. The system may further be configured execute the one or more test cases using one of the primary test case execution channel and the secondary test case execution channel for testing the application. In one embodiment, the secondary test case execution channel is used on failure of the primary test case execution channel.

8 Claims, 4 Drawing Sheets

(56) References Cited

U.S. PATENT DOCUMENTS

| | | | | |
|---|---|---|---|---|
| 2016/0025808 A1* | 1/2016 | Singh | ................. | G01R 31/3177 |
| | | | | 714/733 |
| 2016/0283349 A1* | 9/2016 | Srivastava | ................. | G06F 8/70 |
| 2016/0299837 A1* | 10/2016 | Browne | ............... | G06F 11/3676 |
| 2016/0378649 A1* | 12/2016 | Eilam | ................. | G06F 11/3688 |
| | | | | 717/131 |
| 2018/0046956 A1* | 2/2018 | Marcu | ................. | G06Q 10/0635 |
| 2018/0089071 A1* | 3/2018 | Keskitalo | ............ | G06F 11/3672 |
| 2018/0095866 A1* | 4/2018 | Narayanan | ........... | G06F 11/3688 |
| 2018/0121336 A1* | 5/2018 | Ayyappan | ............ | G06F 11/3692 |
| 2019/0026217 A1* | 1/2019 | Yim | ............ | G06F 8/00 |
| 2019/0065353 A1* | 2/2019 | Tammariello | ........ | G06F 11/3688 |
| 2019/0243752 A1* | 8/2019 | Bakshi | ................. | G06F 11/3688 |
| 2019/0294528 A1* | 9/2019 | Avisror | ..................... | G06F 8/65 |

OTHER PUBLICATIONS

Title: Generating test cases for real-time systems from logic specifications, author: D Mandrioli et al, published on 1995.*
Title: Verification, validation and accreditation of simulation models author: RG Sargent published on 2000.*

* cited by examiner

METHOD AND SYSTEM FOR TESTING AN APPLICATION USING MULTIPLE TEST CASE EXECUTION CHANNELS

PRIORITY INFORMATION

This patent application does not claim priority from any application.

TECHNICAL FIELD

The present subject matter described herein, in general, relates to the field of software testing, and more particularly to a system and method for testing an application using multiple test case execution channels.

BACKGROUND

In the field of software testing, different software testing methodologies/channels are used. These software testing methodologies may include manual testing, automation testing, semi-automation testing, crowdsource testing, Artificial Intelligence testing and alike. However, none of the software testing methodology is perfect. Each software testing methodology has some advantages and disadvantages.

In the software industry, manual testing is mostly used for testing but it is labor intensive, slow time to execute, difficult to scale, error prone, requires high management overhead, costly, and low fragility. Furthermore, automation testing appears as a cure to all the ills of manual testing. Automation testing on the other hand is characterized by more expensive talent (developers not QA), higher upfront costs, fast time to execute, high fragility (tendency of the tests to fail with minimal change). Many companies have tried to achieve 80 to 90% automation which is very difficult to create and almost impossible to maintain. Furthermore, AI based testing is largely dependent on the robustness of the set of software testing examples used for training the bot used in AI based testing. The process of training the bot, for software testing, requires extensive effort. If the bot is not trained appropriately, the bot's efficacy is poor and leads to frequent false positives or false negatives test results. The latest innovation is crowdsource testing that has external low cost low quality talent doing the tests. As these are not trained QA professionals far more documentation is needed, and high fragility may be expected. Hence, each of the software testing methodologies available in the art have some advantages and disadvantages. In such a situation, it is very difficult to determine which software testing methodology should be used for a particular software application in order to perform the software testing in a better and efficient manner.

SUMMARY

Before the present systems and methods for testing software applications are described, it is to be understood that this application is not limited to the particular systems, and methodologies described, as there can be multiple possible embodiments, which are not expressly illustrated in the present disclosure. It is also to be understood that the terminology used in the description is for the purpose of describing the particular versions or embodiments only, and is not intended to limit the scope of the present application. This summary is provided to introduce concepts related to systems and methods for testing of software applications using a set of test case execution channels and the concepts are further described below in the detailed description. The set of test case execution channels may comprise one or more of a manual test case execution channel, an automated test case execution channel, a crowdsource test case execution channel, an artificial intelligence test case execution channel, semi-automated test case execution channel and alike. This summary is not intended to identify essential features of the claimed subject matter nor is it intended for use in determining or limiting the scope of the claimed subject matter.

In one implementation, a system for testing an application using multiple test case execution channels is disclosed. The system may comprise a processor and a memory coupled to the processor. The processor may execute program instructions stored in the memory. The processor may execute program instructions stored in the memory for receiving one or more test cases for testing of the application. The processor may further execute program instructions stored in the memory for identifying a primary test case execution channel and a secondary test case execution channel, corresponding to each of the one or more test cases, from a set of test execution channels based on one or more classification parameters. The processor may further execute program instructions stored in the memory for executing the one or more test cases using one of the primary test case execution channel and the secondary test case execution channel for testing the application. In one embodiment, the secondary test case execution channel is used on failure of the primary test case execution channel.

In another implementation, a method for testing an application using multiple software testing channel is disclosed. The method may comprise receiving one or more test cases for testing of the application. The method may further comprise identifying a primary test case execution channel and a secondary test case execution channel, corresponding to each of the one or more test cases, from a set of test execution channels based on one or more classification parameters. The method may further comprise executing the one or more test cases using one of the primary test case execution channel and the secondary test case execution channel for testing the application. In one embodiment, the secondary test case execution channel is used on failure of the primary test case execution channel.

In yet another implementation, non-transitory computer readable medium embodying a program executable in a computing device for testing an application using multiple software test case execution channel is disclosed. The program may comprise a program code for receiving one or more test cases for testing of the application. The program may further comprise a program code for identifying a primary test case execution channel and a secondary test case execution channel, corresponding to each of the one or more test cases, from a set of test execution channels based on one or more classification parameters. The program may further comprise a program code for executing the one or more test cases using one of the primary test case execution channel and the secondary test case execution channel for testing the application. In one embodiment, the secondary test case execution channel is used on failure of the primary test case execution channel.

BRIEF DESCRIPTION OF THE DRAWINGS

The foregoing detailed description of embodiments is better understood when read in conjunction with the appended drawings. For the purpose of illustrating the disclosure, example constructions of the disclosure is shown in the present document. However, the disclosure is not limited to the specific methods and apparatus disclosed in the document and the drawings.

The detailed description is given with reference to the accompanying figures. In the figures, the left-most digit(s) of a reference number identifies the figure in which the reference number first appears. The same numbers are used throughout the drawings to refer like features and components.

DETAILED DESCRIPTION

Figure 1:
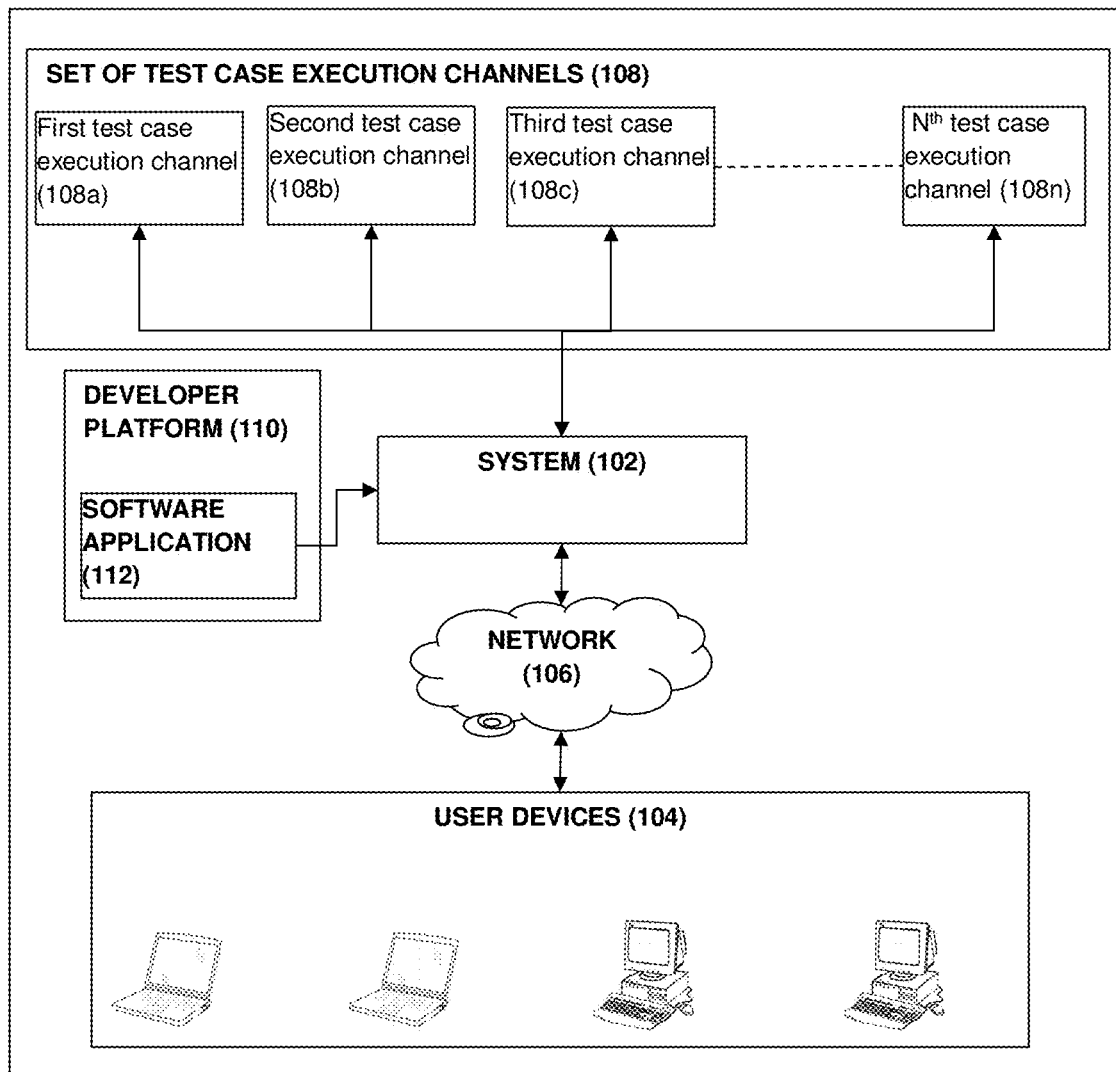
FIG. 1 illustrates a network implementation of a system for testing an application using multiple test case execution channels, in accordance with an embodiment of the present subject matter.

Some embodiments of this disclosure, illustrating all its features, will now be discussed in detail. The words "receiving," "generating," "identifying," and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the exemplary, systems and methods are now described. The disclosed embodiments are merely exemplary of the disclosure, which may be embodied in various forms.

Various modifications to the embodiment will be readily apparent to those skilled in the art and the generic principles herein may be applied to other embodiments. However, one of ordinary skill in the art will readily recognize that the present disclosure is not intended to be limited to the embodiments illustrated, but is to be accorded the widest scope consistent with the principles and features described herein.

In one embodiment, a system for testing an application using multiple test case execution channels, is illustrated. In one embodiment, the system may be linked with a set of testing platform. Each platform may be associated with a test case execution channel for testing the software application. A test case execution channel may be one of a human-technical system comprising a test methodology, bespoke test execution software services, partner/external services, or a set of human resources. The set of test case execution channels may comprise one or more of a manual test case execution channel, an automated test case execution channel, a crowdsource test case execution channel, an artificial intelligence test case execution channel, semi-automated test case execution channel and alike.

In one embodiment, a blend may be generated. For this purpose, the system may be configured to classify one or more test cases into subsets of test cases based on one or more classification parameters/factors and one or more test case execution channels. Furthermore, the blend may be generated by assigning each subset of test case to a corresponding test case execution channel Some examples of the classification factors may include a validation area (GUI [User Experience, UI Action, UI Layout, UI Navigation], Data Validation [UI Data Validation], system [Data management, service management, deployment, shell based Admin]), an automation scripting effort, a test case execution channel feasibility, test case execution channel reliability, Smoke Candidate (Quick & Important), number of platforms/test case execution channels, business complexity, test case execution channel availability, complexity of the application, cost of testing, total time required for execution of the test case. Furthermore, the system may enable defining custom classification parameters/factors. The process of generating the blend using each subset of test case is further elaborated with reference to FIG. 2.

In one embodiment, the system may be configured to monitor execution of the subsets of test cases, wherein each subset of test cases is executed using the corresponding test case execution channel. The system may be configured to monitor one or more execution factors associated with the execution of each subset of test case in real-time. The set of execution factors may comprise channel availability, availability of a resource for execution and number of test case failure. In one embodiment, other factors that affect the execution of test cases may also be monitored.

Furthermore, the system may be configured to reclassify the remaining test cases based on the classification parameters and execution parameters to generate a revised execution blend. The revised execution blend may then be used for testing the software application. Furthermore, the revised execution blend may also be monitored for further refinement in the testing cycle.

While aspects of described system and method for testing an application using multiple test case execution channels and may be implemented in any number of different computing systems, environments, and/or configurations, the embodiments are described in the context of the following exemplary system.

Referring now to FIG. 1, a network implementation 100 of a system 102 for testing an application using multiple test case execution channels is disclosed. The system 102 may be connected to one or more user devices 104, a software developer platform 108, and a set of test case execution channels 110.

Although the present disclosure is explained considering that the system 102 is implemented on a server, it may be understood that the system 102 may be implemented in a variety of computing systems, such as a laptop computer, a desktop computer, a notebook, a workstation, a mainframe computer, a server, a network server, a cloud-based computing environment. It will be understood that the system 102 may be accessed by multiple users/testers through one or more user devices 104-1, 104-2 . . . 104-N, collectively referred to as user 104 or stakeholders, hereinafter, or applications residing on the user devices 104. In one implementation, the system 102 may comprise the cloud-based computing environment in which a user may operate individual computing systems configured to execute remotely located applications. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

In one embodiment, the software developer platform 108 may enable software developers to develop an application/computer program hereinafter referred as a software application 112. Once the software application 112 is developed, in the next step the software application 112 may be received/accessed through the system 102 for the purpose of testing. In one embodiment, one or more testers may access the system 102 using the user devices 104 and submit one or more test cases definitions for testing the software application 112. Further, the system 102 may be configured to validate the test case definitions submitted by the tester based on predefined rules and parameters. In one embodiment, once the tester inputs are received, the system 102 may be configured to automatically generate the set of test case definitions by applying Artificial Intelligence Algorithms and Natural language processing (NLP) on the tester inputs. In one embodiment, each test case definition may be associated with a set of characteristics. The set of characteristics may comprise consistent granularity, communicability, comprehensiveness, transformable from one test case execution channel to another, and measurability. The one or more test cases definitions may be normalized such that each test case definition may be used in order to generate a test case corresponding to each test case execution channel from a set of test case execution channels 108. The one or more test cases definitions may be normalized such that each test case definition may be used in order to generate a test case corresponding to each test case execution channel from the set of test case execution channels 108. In one embodiment, the set of test case execution channels may include manual test case execution channel, automated test case execution channel, crowdsource test case execution channel, Artificial Intelligence test case execution channel and alike.

Furthermore, each test case definition may be associated with a primary test case execution channel and a secondary test case execution channel. The primary test case execution channel is the most preferred test case execution channel to be used for execution of the test case, whereas the secondary test case execution channel may be considered for execution of the test case, if the primary test case execution channel is not available or fails to execute the test case.

In one example, for test case one, the primary test case execution channel may be manual test case execution and secondary test case execution channel may be automated test case execution. In another example, for test case two, the primary test case execution channel may be automated test case execution and secondary test case execution channel may be crowdsourcing. As a result, based on the characteristics of each test case, the primary and secondary test case execution channel associated with each test case may be different.

In one embodiment, the system 102 may be configured to identify the primary test case execution channel and secondary test case execution channel by analyzing each test case based on a target optimization criterion and one or more classification parameters. The one or more classification parameters may be selected from validation area (GUI [User Experience, UI Action, UI Layout, UI Navigation], Data Validation [UI Data Validation], system [Data management, service management, deployment, shell based Admin]), an automation scripting effort, a test case execution channel feasibility, test case execution channel reliability, Smoke Candidate (Quick & Important), number of platforms/test case execution channels, business complexity, test case execution channel availability, complexity of the application, cost of testing, total time required for execution of the test case. The target optimization criterion may be one of cost optimization, effort optimization, time optimization and the like. In one embodiment, a combination of two or more target optimization criterions may be used to identify the primary test case execution channel and secondary test case execution channel.

In one example, if the user selects execution time optimization as the target optimization criterion, then the system 102 may be configured to analyze the one or more classification parameters to identify a primary test execution channel which will lead to execution time optimization. In this case, the system may select Automation testing as the primary test case execution channel in order to achieve execution time optimization. It must be noted that every time the user selects execution time optimization as the target optimization criterion, the system 102 may not suggest Automation testing channel as the primary test case execution channel. The selection of primary test case execution channel is dependent on one or more classification parameters and the characteristics of the test case.

The system 102 is configured to analyze test case based on each on the one or more classification parameters in order to determine a test case execution channel that can achieve the target optimization criterion (execution time optimization). For example, if the test case is associated with testing of password field on the login page, then the system 102 may identify automation testing channel as the primary test case execution channel. However, if the test case is for testing images and alignment on the landing page, the system 102 may suggest manual test execution channel as the primary test case execution channel. The system may also identify a second best option (secondary test execution channel) based on the target optimization criteria. For example, if the target optimization criteria is execution time optimization, then the system 102 may determine semi-automated testing as the second test case execution channel for testing images and alignment on the landing page.

It is to be noted that for determining the primary test cases execution channel (i.e. best suitable test execution channel) the system 102 does not execute the test case using each of the test execution channels. In one embodiment, the system 102 may be configured to maintain a database of historical test cases and best suited test case execution channel associated with each of the historical test case. The primary test case execution channel for each new test case may be determined based on the similarity/similar characteristics between the new test case and one or more historical test cases stored in the database of historical test cases.

In one embodiment, the one or more test cases may be classified into subsets of test cases based on the one or more classification factors and test case execution channels associated with each of the test cases. Furthermore, based on the classification, an execution blend may be generated. The execution blend may comprise a subset of test cases. Each subset may comprise a one or more test cases with same primary and/or secondary test case execution channel. For example, all the test cases with the same primary test case execution channel may be clubbed together into a single subset of test cases. This subset of test cases is referred to as the execution blend. The execution blend may comprise a subset of test cases corresponding to manual test case execution channel, automated test case execution channel, crowdsource test case execution channel, Artificial Intelligence test case execution channel. For example, if there are one thousand test cases available for testing a software application, then the system 102 is configured to identify primary and secondary test case execution channels associated with each of the test cases. Based on the primary test case execution channel, the system 102 is configured to divide the thousand test cases into subset of test cases, each subset corresponding to one of manual test case execution channel, automated test case execution channel, crowdsource test case execution channel, and Artificial Intelligence test case execution channel. The execution blend is then used for testing the software application 112 over multiple test case execution methodologies/channels.

In one embodiment, once the execution blend is used for testing the software application 112, the execution status of the test cases is monitored. If it is determined by the system that the execution will not completed within the desired time using the existing execution blend. The system 102 is configured to update the existing blend and generate a refined execution blend based on one or more execution factors/parameters. This allow for flexibility in test execution to cover for issues that may occur in real-time. For example when a software build/software application 112 is delivered there may be for example higher than expected test case failures using automation test case execution. The execution blend is then refined such that most of the test cases may be executed on manual or crowdsourcing channel. As each channel is different there are over 15 variables that need to be tracked and adjusted for based on the test cases as well external factors on the day of execution.

Finally, the system 102 is adaptive in that as the executions are carried it is tracked in a feedback loop mechanism to keep improving the efficiency of the system 102.

In one embodiment, the factors that impact the execution blend may include:

Validation area (GUI[User Experience, UI Action, UI Layout, UI Navigation], Data Validation [UI Data Validation], system [Data management, service management, deployment, shell based Admin])
Automation Scripting Effort
Test case execution channel Feasibility
Test case execution channel Reliability
Smoke Candidate (Quick & Important)
Number of platforms/test case execution channels
Business Complexity
Test case execution channel availability
Complexity of the application
Cost of testing
Total time required for execution of the test case
Custom classification parameters/factors defined by the user The channel selection process is continuously evolving where dynamic variables that changed at run time may include:

1 Channel crowdsource non availability (the technical infrastructure is down)
2. Channel crowdsource non execution of test cases (unavailability of human actors in the network)
3. Channel automation is down or unable to execute test case (due to technical failure of the test tooling)
4. Unavailability of manual channel (tester unavailability due to full day or half day Leave)

In one embodiment, for the selection of a primary and secondary test case execution methodology/channel (i.e. what Channel (manual, automation, crowdsource test case execution) should be used for a particular test case to be executed) the following algorithm may be used:

```
IF ValidationArea = UILayout THEN
    IF Automatable THEN Automate
    ELSE Manual
ELSE IF ValidationArea = UINavigation THEN
    IF Automatable THEN Automate
    ELSE IF Crowdsourcable THEN Crowdsource
ELSE Manual
/* Whether to Automate a test case is dependent on following variables:
- If the Validation area is UILayout, UI Navigation, UI actions, or UX
    UI Layout - Page Formatting (Colors, Borders, Alignments, Spacing, Images),
    Static data content (Titles, Labels, Headers, Images), Text Formatting
    (Aligment, Font, Color, Capitalization, Dates)
    UI Navigation - Flow from one location to another location. Very Light
    verification of loaded page layout and data
    UI Actions - Clickable hyperlink and form actions e.g. Menu, View, Expand,
    Export, Print, but not Create, Save, Edit
    UX - Overall usability and user experience
- If Technical feasibility is a YES for Automation
- If automation scripting effort is low (currently the threshold is 2 hours)
- If execution reliability is HIGH */
```

In addition to quality, execution time and feasibility (the practicality of actually using that test case execution channel) another factor that is taken into consideration is the cost for conducting the test case. This is a complex number as for example for manual test case execution resources if they are available they are cheaper than any other test case execution resource as they are otherwise potentially idle. On the other hand, if they are already allocated then overtime costs or quality of life issues come into play.

In a similar manner the system 102 is configured to analyze each of the channels for each test case. The process of using the execution blend in order to test the software application 112 is further elaborated with respect to FIGS. 2, 3, and 4.

Figure 2:
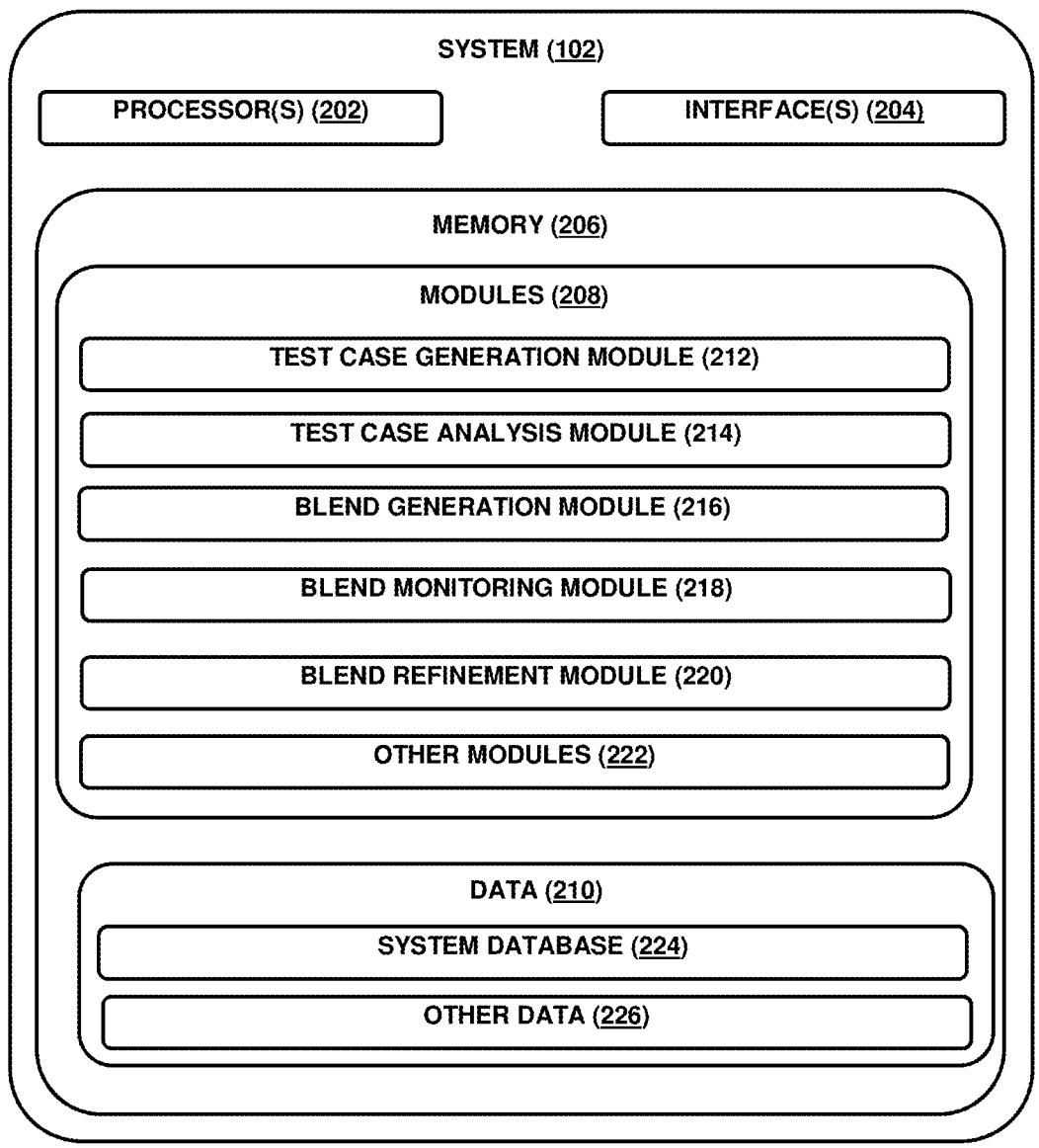
FIG. 2 illustrates the system, in accordance with an embodiment of the present subject matter.

Referring now to FIG. 2, the system 102 is illustrated in accordance with an embodiment of the present subject matter. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with the user directly or through the client devices 104. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 include routines, programs, objects, components, data structures, etc., which perform particular tasks or implement particular abstract data types. In one implementation, the modules 208 may include a test case generation module 212, a test case analysis module 214, a blend generation module 216, a blend monitoring module 218, a blend refinement module 220 and other modules 222. The other modules 222 may include programs or coded instructions that supplement applications and functions of the system 102. The modules 208 described herein may be implemented as software modules that may be executed in the cloud-based computing environment of the system 102.

The data 210, amongst other things, serves as a repository for storing data processed, received, and generated by one or more of the modules 208. The data 210 may also include a system database 224 and other data 226. The other data 226 may include data generated as a result of the execution of one or more modules in the other modules 222.

As there are various challenges observed in the existing art, the challenges necessitate the need to build the system 102 for testing a software application using multiple test case execution channels. In one embodiment, the software program 112 may correspond to at least one of a web page, a software code, a software application, SAAS, PAAS, a mobile application, and alike. In order to test the software application 112, initially, the software program 112 may be deployed at the system 102. Further, a user (hereinafter may also referred to as a software tester) may use the client device 104 to access the system 102 via the I/O interface 204. The user may register them using the I/O interface 204 in order to use the system 102. The system 102 may employ the test case generation module 212, a test case analysis module 214, a blend generation module 216, a blend monitoring module 218, a blend refinement module 220. The detail functioning of the modules is described below with the help of figures.

In one embodiment, the test case generation module 212 may be configured to receive one or more test cases for testing of the software application 112. The one or more test cases may be received from a tester assigned to the software application 112. The tester may analyze the software application and accordingly generate one or more test cases for testing the software application 112. Further, the test case generation module 212 may be configured to validate the test case definitions submitted by the tester based on pre-defined rules and parameters. In yet another embodiment, once the tester inputs are received, the test case generation module 212 may be configured to automatically generate the set of test case definitions by applying Artificial Intelligence Algorithms and Natural language processing (NLP) on the tester inputs. In another embodiment, the tester inputs may be in the form of instructions (i.e. 'test password field on Login Page for Alphanumeric characters', 'test the date filed on the calendar tab for leap years'). In one embodiment, a Natural language processing Engine may be configured to interpret the inputs received from the tester. These interpretations may be converted into test case definitions using an artificial intelligence engine. The artificial intelligence engine may be trained to generate test case definitions based on the inputs provided by the tester. In one embodiment, each test case definition may be associated with a set of characteristics. The set of characteristics may comprise consistent granularity, communicability, comprehensiveness, transformable from one test case execution channel to another, and measurability. The one or more test cases definitions may be normalized such that each test case definition may be used in order to generate a test case corresponding to each test case execution channel from a set of test case execution channels 108.

Further, the test case analysis module 214 may be configured to identify a primary test case execution channel and a secondary test case execution channel, corresponding to each of the one or more test cases, from a set of test execution channels based on one or more classification parameters. The set of test execution channels may comprise one or more of a manual test case execution channel, an automated test case execution channel, a crowdsource test case execution channel, an artificial intelligence test case execution channel, semi-automated test case execution channel and the like. Furthermore, the one or more classification parameters may comprise a validation area (GUI [User Experience, UI Action, UI Layout, UI Navigation], Data Validation [UI Data Validation], system [Data management, service management, deployment, shell based Admin]), an automation scripting effort, a test case execution channel feasibility, test case execution channel reliability, Smoke Candidate (Quick & Important), number of platforms/test case execution channels, business complexity, test case execution channel availability, complexity of the application, cost of testing, total time required for execution of the test case. In one embodiment, other user defined classification parameters may also be considered for identifying the primary test case execution channel and the secondary test case execution channel, corresponding to each of the one or more test cases.

In one embodiment, the blend generation module 216 may be configured to classify the one or more test cases into one or more categories based on one of the primary test case execution channel and the secondary test case execution channel associated with each test case. In one embodiment, each of the one or more categories is associated with a test case execution channel from the set of test case execution channels. Further, the system may be configured to generate an execution blend based on the classification. The execution blend is indicative of a percentage of test cases in each of the one or more categories.

Further, the blend generation module 216 may be further configured to execute the one or more test cases using one of the primary test case execution channel and the secondary test case execution channel for testing the software application. In one embodiment, the secondary test case execution channel is used on failure of the primary test case execution channel.

In one embodiment, the blend monitoring module 218 may be configured to determine an execution status associated with one or more categories based on monitoring of the execution of the one or more test case in each categories.

Furthermore, the blend refinement module 220 may be configured to revise the execution blend based on the execution status and one or more execution parameters. The revision is based on identification of a revised test case execution channel. Further, the one or more execution parameters comprise channel availability, availability of a resource for execution and number of test case failure.

Figure 3:
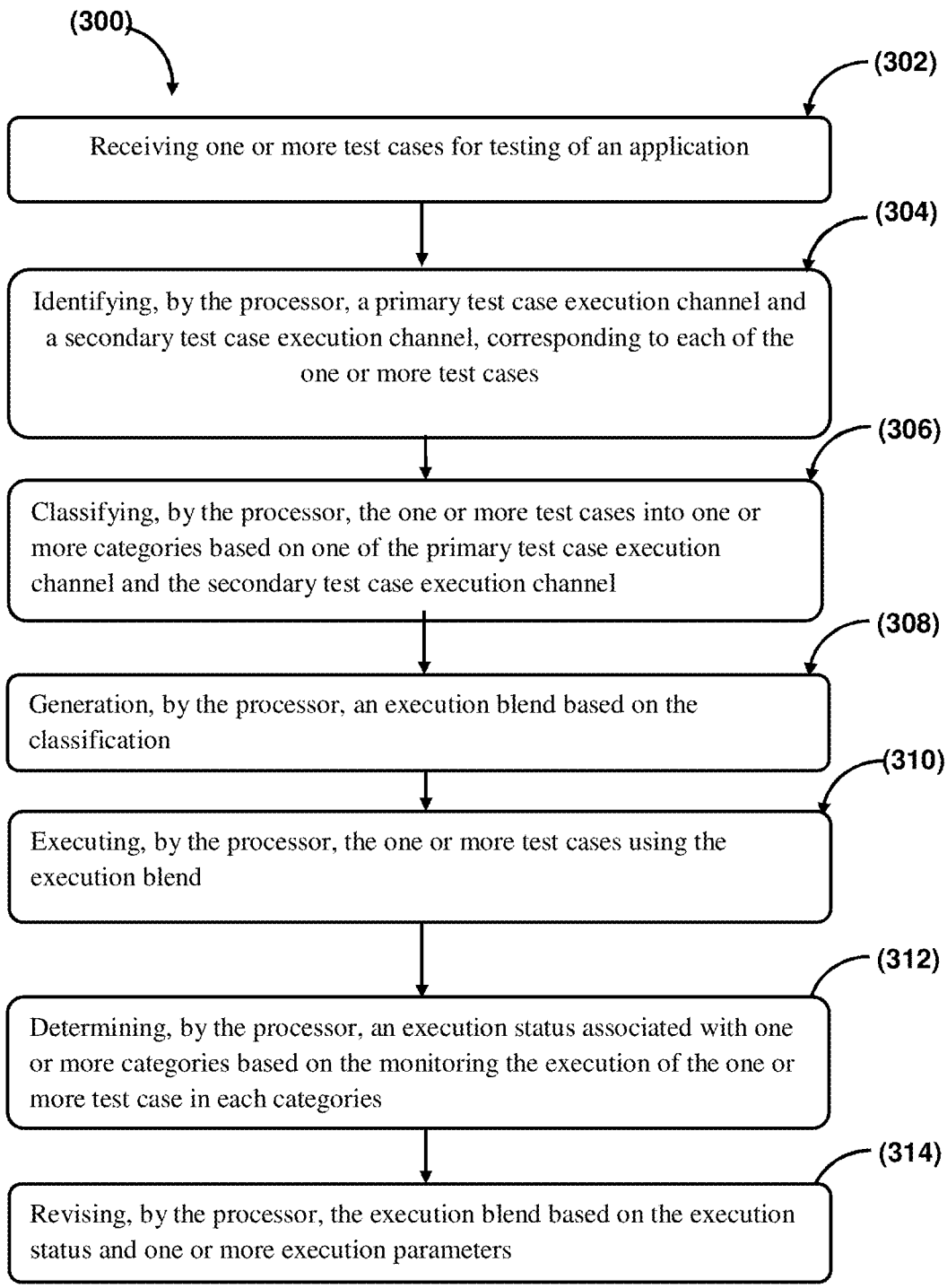
FIG. 3 illustrates a method for testing the application using multiple test case execution channels, in accordance with an embodiment of the present subject matter.

Referring now to FIG. 3, a method 300 for testing software application using multiple test case execution channels is shown, in accordance with an embodiment of the present subject matter. The method 300 may be described in the general context of computer executable instructions. Generally, computer executable instructions can include routines, programs, objects, components, data structures, procedures, modules, functions, etc., that perform particular functions or implement particular abstract data types. The method 300 may also be practiced in a distributed computing environment where functions are performed by remote processing devices that are linked through a communications network. In a distributed computing environment, computer executable instructions may be located in both local and remote computer storage media, including memory storage devices.

The order in which the method 300 is described is not intended to be construed as a limitation, and any number of the described method blocks can be combined in any order to implement the method 300 or alternate methods. Additionally, individual blocks may be deleted from the method 300 without departing from the spirit and scope of the subject matter described herein. Furthermore, the method can be implemented in any suitable hardware, software, firmware, or combination thereof. However, for ease of explanation, in the embodiments described below, the method 300 may be considered to be implemented as described in the system 102.

At block 302, the test case generation module 212 may be configured to receive one or more test cases for testing of the software application 112. The one or more test cases may be received from a tester assigned to the software application 112. The tester may analyze the software application and accordingly generate one or more test cases for testing the software application 112. Further, the test case generation module 212 may be configured to validate the test case definitions submitted by the tester based on predefined rules and parameters. In one embodiment, once the tester inputs are received, the test case generation module 212 may be configured to automatically generate the set of test case definitions by applying Artificial Intelligence Algorithms and Natural language processing (NLP) on the tester inputs. In one embodiment, each test case definition may be associated with a set of characteristics. The set of characteristics may comprise consistent granularity, communicability, comprehensiveness, transformable from one test case execution channel to another, and measurability. The one or more test cases definitions may be normalized such that each test case definition may be used in order to generate a test case corresponding to each test case execution channel from a set of test case execution channels 108.

At block 304, the test case analysis module 214 may be configured to identify a primary test case execution channel and a secondary test case execution channel, corresponding to each of the one or more test cases, from a set of test execution channels based on one or more classification parameters. The set of test execution channels may comprise one or more of a manual test case execution channel, an automated test case execution channel, a crowdsource test case execution channel, an artificial intelligence test case execution channel, semi-automated test case execution channel and the like. Furthermore, the one or more classification parameters may comprise a validation area, an automation scripting effort, a test case execution channel feasibility, test case execution channel reliability, test case execution channel availability, complexity of the application, cost of testing, total time required for execution of the test case. In one embodiment, other user defined classification parameters may also be considered for identifying the primary test case execution channel and the secondary test case execution channel, corresponding to each of the one or more test cases.

At block 306, the blend generation module 216 may be configured to classify the one or more test cases into one or more categories based on one of the primary test case execution channel and the secondary test case execution channel associated with each test case. In one embodiment, each of the one or more categories is associated with a test case execution channel from the set of test case execution channels.

At block 308, the blend generation module 216 may be configured to generate an execution blend based on the classification. The execution blend is indicative of a percentage of test cases in each of the one or more categories.

At block 310, the blend generation module 216 may be further configured to execute the one or more test cases using the execution blend indicates primary test case execution channel and the secondary test case execution channel associated with each test case for testing the software application. In one embodiment, the secondary test case execution channel is used on failure of the primary test case execution channel.

At block 312, the blend monitoring module 218 may be configured to determine an execution status associated with one or more categories based on monitoring of the execution of the one or more test case in each categories.

At block 314, the blend refinement module 220 may be configured to revise the execution blend based on the execution status and one or more execution parameters. The revision is based on identification of a revised test case execution channel. Further, the one or more execution parameters comprise channel availability, availability of a resource for execution and number of test case failure. The process of refining the blend is further elaborated with respect to FIG. 4.

Figure 4:
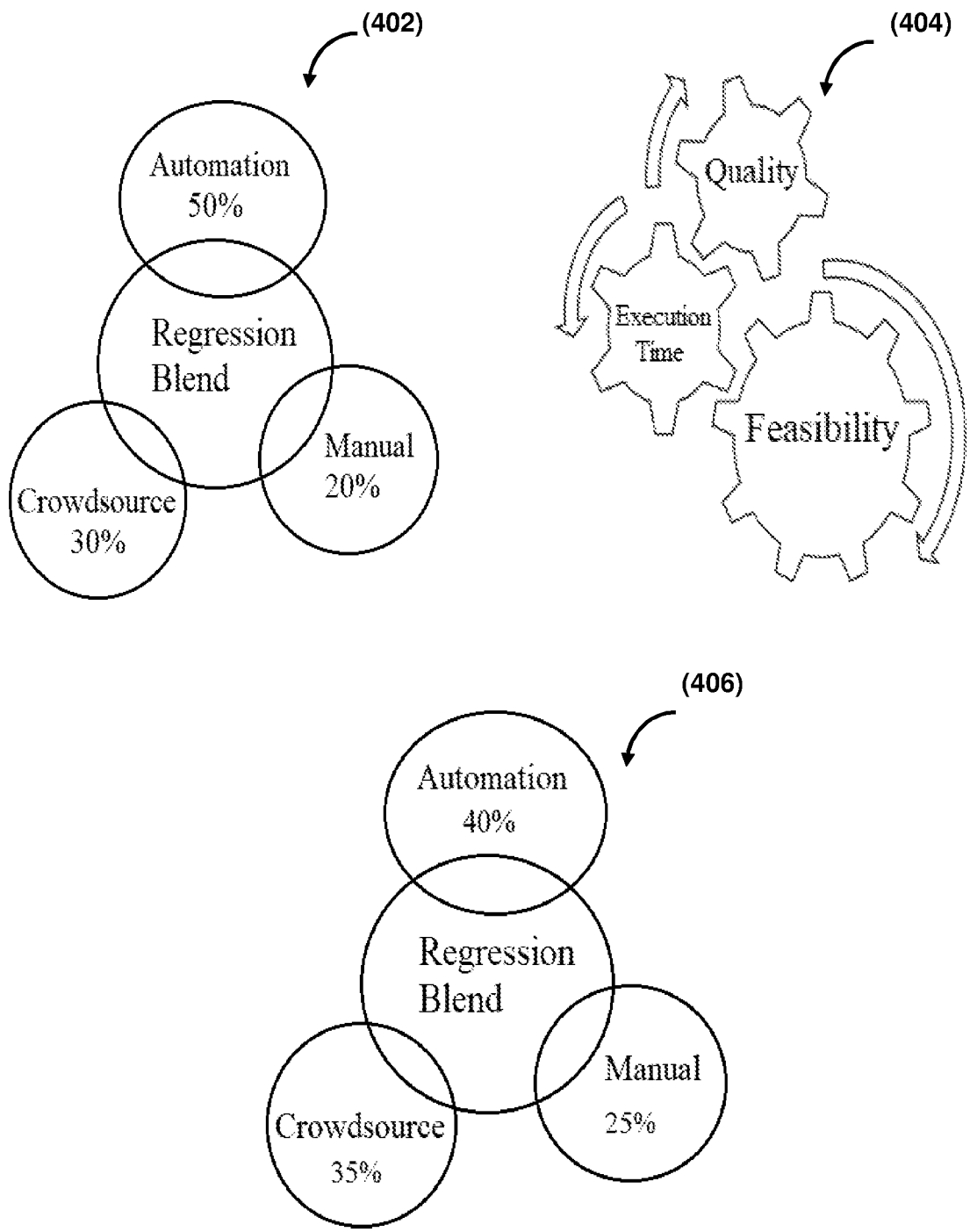
FIG. 4 illustrates an example of testing the application using multiple test case execution channels, in accordance with an embodiment of the present subject matter.

FIG. 4 represents the process of refining the execution blend using one or more execution parameters. Once the execution blend 402 is generated using the processed described in FIG. 3, in the next step, the text execution cycle performed using the execution blend 402 is monitored for determining any lag in the target time of completion of the testing cycle and estimated time of completion of the testing cycle. For determining the lag, one or more execution parameters/factors 404 are monitored in real-time. For example, the one or more execution parameters/factors 404 may comprise, quality, execution time, feasibility, and alike. In case if a lag is determined, process of determining, the blend refinement module 220, is configured to modify the execution blend 402 and generate a refined execution blend 406 in order to compensate for the lag. For example, the execution blend 402 prepared before the testing cycle may comprise a combination of Automated testing 50%, Crowdsource testing 30%, and Manual Testing 20%. Furthermore, during the test execution cycle, the blend refinement module 220 is configured to monitor the one or more execution parameters/factors 404 and determine if the testing cycle is performed as per expectations of the tester. If it is observed that the testing cycle is lagging in time, performance, or any other parameter, the blend refinement module 220 may be configured to refine the execution blend 402. For example, if it is determined that the automation test case execution channel is not fetching reliable test results, the blend refinement module 220 may refine the execution blend 402 (Automated test case execution channel 50%, Crowdsource test case execution channel 30%, and Manual test case execution channel 20%) to the refined execution blend 406 (Automated test case execution channel 40%, Crowdsource test case execution channel 35%, and Manual test case execution channel 25%). While shifting the 10% automation test cases to Crowdsource test case execution channel and Manual test case execution channel, the blend refinement module 220 is first configured to identify which test cases are linked with automated test cases have a secondary test case execution channel as Crowdsource test case execution channel or Manual test case execution channel Since the primary test case execution channel (Automated test case execution channel) is failing to execute these test cases, these test cases are shifted to the Crowdsource test case execution channels and Manual Test case execution channels.

Although implementations for methods and systems for testing the application using multiple test case execution channels have been described in language specific to structural features and/or methods, it is to be understood that the appended claims are not necessarily limited to the specific features or methods described. Rather, the specific features and methods are disclosed as examples of implementations for testing the application using multiple testing channels.

The invention claimed is:

1. A method for testing an application, the method comprising:
receiving, by a processor, one or more test cases for testing of an application;
identifying, by the processor, a primary test case execution channel and a secondary test case execution channel from a set of test case execution channels, corresponding to each of the one or more test cases, from a set of test execution channel based on one or more classification parameters, wherein the set of test case execution channels comprise a manual test case execution channel, automated test case execution channel, crowdsource test case execution channel, or an Artificial Intelligence test case execution channel;
executing, by the processor, the one or more test cases using one of the primary test case execution channel and the secondary test case execution channel for testing the application, wherein the secondary test case execution channel is used on failure of the primary test case execution channel;

classifying, by the processor, the one or more test cases into one or more categories based on at least one of the set of test case execution channels and test case execution sub-channels; wherein each of the one or more categories is associated with a test case execution channel from the set of test case execution channels, wherein the set of test case execution sub-channels comprises at least one of an Automation testing Channel 1, an Automation testing Channel 2, a Crowdsource test case execution Channel 1, a Crowdsource test case execution Channel 2, and a Manual test case Channel 1; and
generating by the processor, an execution blend based on the classification, wherein the execution blend is indicative of a percentage of test cases in each of the one or more categories.

2. The method of claim 1 further comprising:
determining, by the processor, an execution status associated with one or more categories based on a monitoring the execution of the one or more test case in each categories; and
revising, by the processor, the execution blend based on the execution status and one or more execution parameters, wherein the revision is based on identification of a revised test case execution channel.

3. The method of claim 1, wherein one or more classification parameters comprise a validation area, an automation scripting effort, a test case execution channel feasibility, test case execution channel reliability, test case execution channel availability, complexity of the application, cost of testing, total time required for execution of the test case.

4. The method of claim 2, wherein one or more execution parameters comprise channel availability, availability of a resource for execution and number of test case failure.

5. A system for testing an application, the system comprising:
a memory; and
a processor coupled to the memory, wherein the processor is capable of executing instructions to perform steps of:
receiving one or more test cases for testing of an application;
identifying a primary test case execution channel and a secondary test case execution channel from a set of test case execution channels, corresponding to each of the one or more test cases, from a set of test case execution channel based on one or more classification parameters, wherein the set of test case execution channels comprise a manual test case execution channel, automated test case execution channel, crowdsource test case execution channel, or an Artificial Intelligence test case execution channel;
executing the one or more test cases using one of the primary test case execution channel and the secondary test case execution channel for testing the application, wherein the secondary test case execution channel is used on failure of the primary test case execution channel;
classifying the one or more test cases in to one or more categories based on at least one of the set of test case execution channels and test case execution sub-channels, wherein each of the one or more categories is associated with one test case execution channel from the set of test case execution channels, wherein the set of test case execution sub-channels comprise at least one of an Automation testing Channel 1, an Automation testing Channel 2, a Crowdsource test case execution Channel 1, a Crowdsource test case execution Channel 2, and a Manual test case Channel 1; and generating an execution blend based on the classification, wherein the execution blend is indicative of a percentage of test cases in each of the one or more categories.

6. The system of claim 5, further comprising determining, by the processor, an execution status associated with one or more categories based on a monitoring the execution of the one or more test case in each categories; and revising, by the processor, the execution blend based on the execution status and one or more execution parameters, wherein the revision is based on identification of a revised test case execution channel.

7. The system of claim 6, wherein one or more execution parameters comprise channel availability, availability of a resource for execution and number of test case failure.

8. A non-transitory computer-readable storage medium having embodied thereon a program product for testing an application, the program product further comprising instructions, configured to be executed in a computing device, the instructions comprising instructions for:

receiving one or more test cases for testing of an application;

identifying a primary test case execution channel and a secondary test case execution channel from a set of test case execution channels, corresponding to each of the one or more test cases, from a set of test case execution channel based on one or more classification parameters, wherein the set of test case execution channels comprise a manual test case execution channel, automated test case execution channel, crowdsource test case execution channel, or an Artificial Intelligence test case execution channel;

executing the one or more test cases using one of the primary test case execution channel and the secondary test case execution channel for testing the application, wherein the secondary test case execution channel is used on failure of the primary test case execution channel;

classifying the one or more test cases in to one or more categories based on at least one of the set of test case execution channels and test case execution sub-channels, wherein each of the one or more categories is associated with one test case execution channel from the set of test case execution channels, wherein the set of test case execution sub-channels comprise at least one of an Automation testing Channel 1, an Automation testing Channel 2, a Crowdsource test case execution Channel 1, a Crowdsource test case execution Channel 2, and a Manual test case Channel 1; and generating an execution blend based on the classification, wherein the execution blend is indicative of a percentage of test cases in each of the one or more categories.

* * * * *